Figure 1:
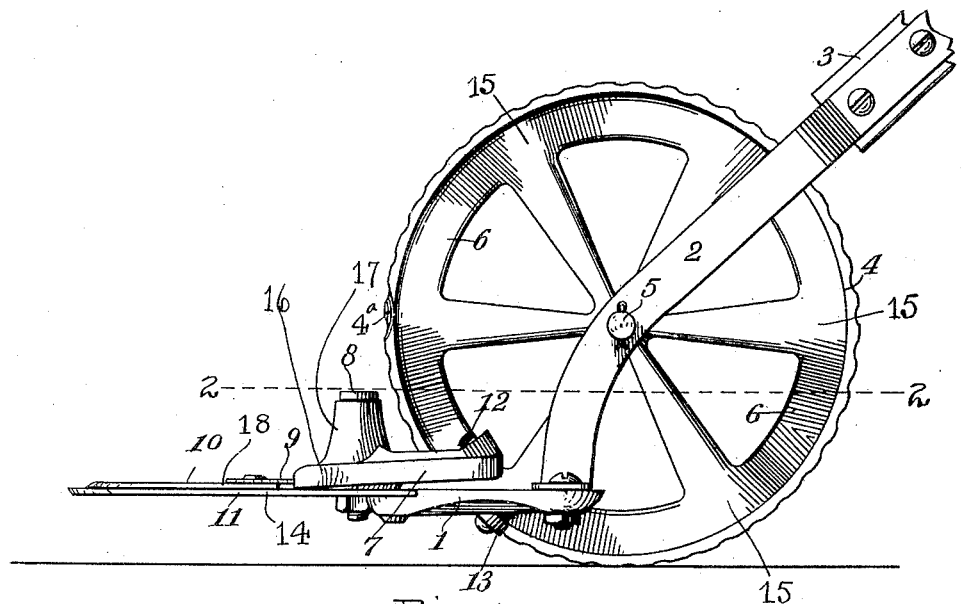

F. E. STOVER.
LAWN TRIMMER.
APPLICATION FILED OCT. 21, 1912.

1,071,110.

Patented Aug. 26, 1913.

2 SHEETS—SHEET 1.

Witnesses
Ray W. Longfield
Mae Parkin

Inventor
Francis E. Stover
By Luther V. Moulton
Attorney

F. E. STOVER.
LAWN TRIMMER.
APPLICATION FILED OCT. 21, 1912.
1,071,110.
Patented Aug. 26, 1913.
2 SHEETS—SHEET 2.
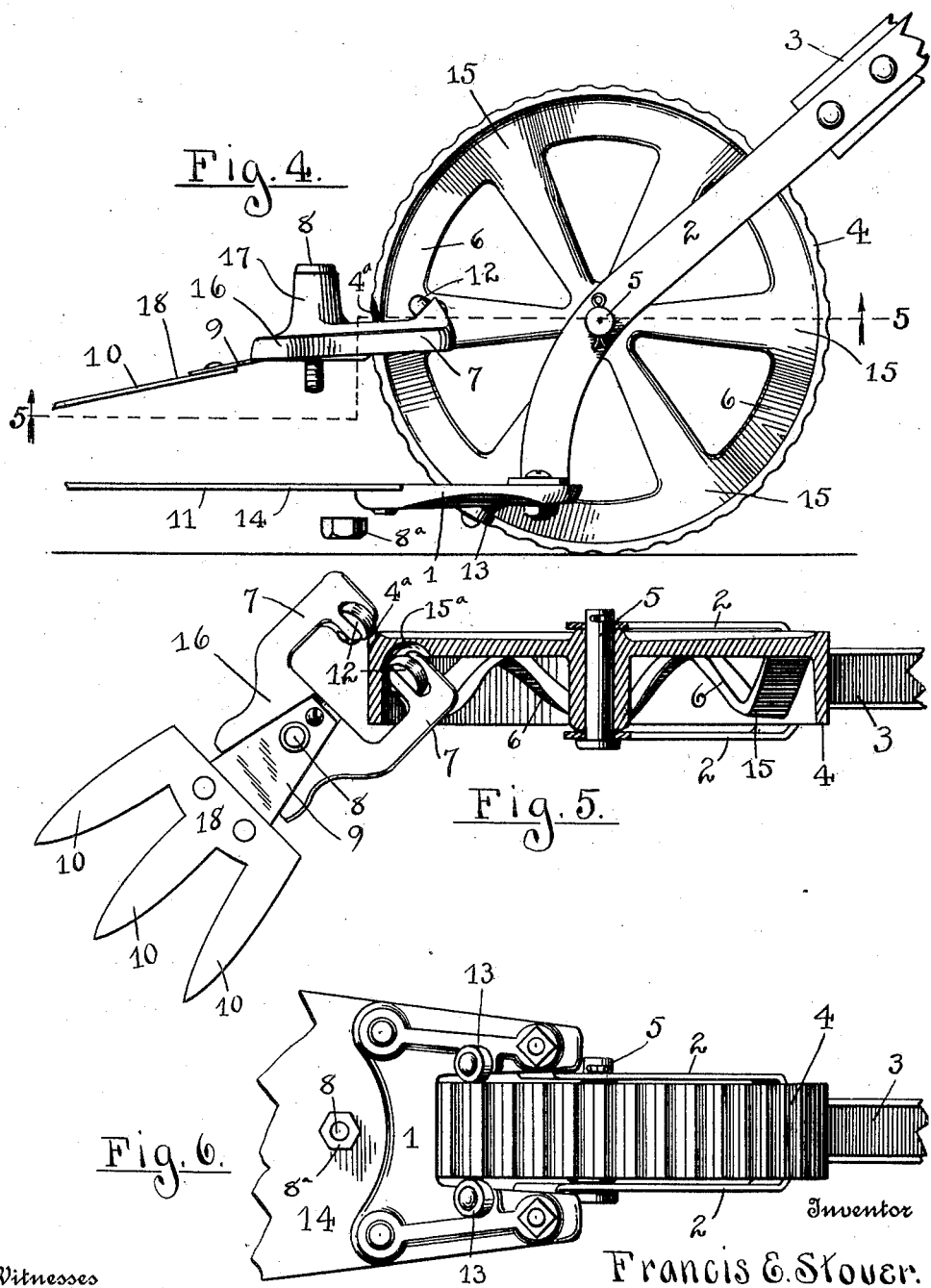
Witnesses
Raj W. Longfield.
Mae Parkin
Inventor
Francis E. Stover.
By Luther V. Moulton
Attorney

UNITED STATES PATENT OFFICE.

FRANCIS E. STOVER, OF MUSKEGON, MICHIGAN, ASSIGNOR OF ONE-HALF TO DONALD J. CAMPBELL, OF MUSKEGON HEIGHTS, MICHIGAN.

LAWN-TRIMMER.

1,071,110.   Specification of Letters Patent.   Patented Aug. 26, 1913.

Application filed October 21, 1912. Serial No. 727,050.

*To all whom it may concern:*

Be it known that I, FRANCIS E. STOVER, a citizen of the United States of America, residing at Muskegon, in the county of Muskegon and State of Michigan, have invented certain new and useful Improvements in Lawn-Trimmers; and I do hereby declare the following to be a full, clear, and exact description of the invention, such as will enable others skilled in the art to which it appertains to make and use the same.

My invention relates to improvements in lawn trimmers, and more particularly to that type of lawn trimmers having horizontal coöperating shear blades adapted to trim lawn edges, narrow areas and the like, and its object is to provide a device which will be simple and economical in construction, easy and effective of operation and one which may be easily and quickly disassembled for cleaning, repairing, etc., and to provide the device with various other new and useful features as hereinafter more fully described and particularly pointed out in the claims.

The device consists essentially of a fixed horizontal body member carried upon the lower end of a bifurcated handle in which is journaled a supporting and operating wheel, a fixed shear blade mounted on the body portion, and a coöperating oscillatory blade superimposed upon the fixed blade and attached to an oscillatory blade holder which is pivoted to the fixed body portion and which has rearwardly extending arms embracing the rim of the operating wheel and provided at their ends with anti-friction rollers which engage a serpentine cam concentric with the axis of the wheel and integral with the rim thereof. The oscillatory blade is connected to the blade holder by a flat spring which keeps it constantly in engagement with the fixed shear blade and connects it permanently to the blade holder so that the whole oscillatory portion of the machine may be assembled or disassembled in integrity. This oscillatory portion of the machine may be disconnected by simply removing the nut which attaches the pivot bolt of the blade holder to the body of the machine and may be then raised or wholly removed for cleaning, etc. Lateral movement of the operating wheel is prevented by rollers mounted on the under side of the body portion on opposite sides of the rim of the wheel and engaging opposite edges thereof.

Figure 2:
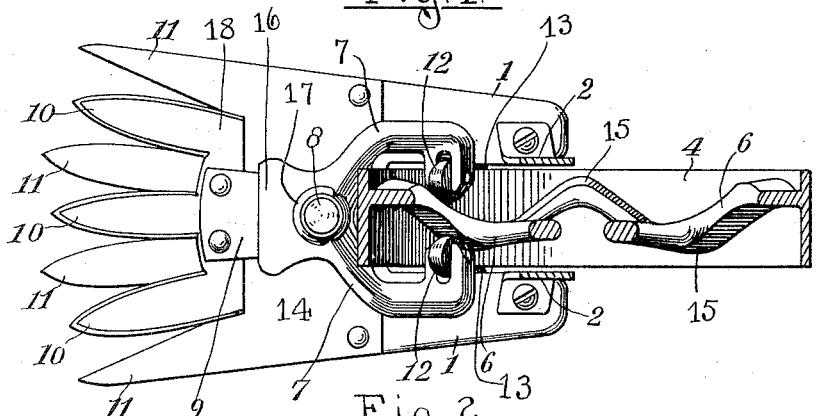
Figure 3:
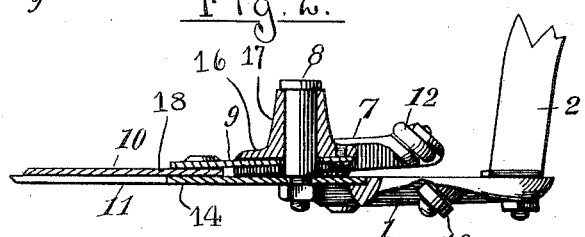

The device is also provided with various other new and useful features of construction and arrangement as clearly shown in the accompanying drawings, in which;

Figure 1 is a side view of a lawn trimmer embodying my invention, the propelling handle being broken away, Fig. 2 is a horizontal section of the same on the line 2—2 of Fig. 1, Fig. 3 is a vertical longitudinal section of the parts shown in Fig. 2, the supporting and operating wheel being omitted, Fig. 4 is a side elevation of the device showing the movable blade holder and parts connected thereto in disconnected and raised position, Fig. 5 is a view on the line 5—5 of Fig. 4, partially in section and partially in inverted plan, and Fig. 6 is an inverted plan view of the under side of the machine with parts broken away.

Like numbers refer to like parts in all of the figures.

1 represents the body portion or bed plate which is mounted upon the lower end of the bifurcated handle 2, the upper portion 3 of this handle being broken away. A supporting and operating wheel 4 is pivoted in the handle at 5. The bed plate is provided with a forwardly extending member 14 having fixed shear blades 11 projecting therefrom while the movable member 16 which carries the coöperating oscillatory blades 10 oscillates about the pivot bolt 8 which extends through the stationary blade 14 and is held in position by the nut 8ª. To insure a close contact between the fixed and movable blades the oscillatory blades are connected with the blade holder 17 by means of a spring 9 which is in a recess in the under side of the blade holder and is firmly attached to the blades 18 and exerts a constant downward pressure thereon.

The oscillatory blade holder 17 is provided with rearwardly extended arms 7 embracing the rim of the wheel 4 and the ends of these arms are provided with anti-friction rollers 12 which engage opposite sides of a serpentine web 6 which is integral with the rim of the wheel and projects therefrom toward the axis of the wheel. This web is serpentine in plane development, having oppositely disposed cam surfaces 15 and serves to actuate the movable portions of the machine as the wheel 4 is rotated. The alternate thrust of the cam 6 against the arms 7 tends to move the rim of the wheel laterally and to cause it to wabble and bind. I have provided two small guide rollers 13 journaled on the under side of the body portion 1 engaging the rim of the wheel on opposite sides. These rollers prevent any lateral movement of the same and prevent binding of the same.

To detach the movable portion 16 of the machine it is merely necessary to remove the nut 8ª from the pivot bolt 8, after which the movable portion consisting of the blade holder, oscillatory blades and connecting spring may be lifted in integrity from the fixed blades and body portion. This leaves the arms 7 embracing the rim of the wheel and in order to remove them therefrom the end of one of the arms is placed in a recess 15ª which is provided at the base of the web 6 and the opposite arm may then be swung through a notch 4ª in the rim of the wheel and the movable portion entirely removed. This construction facilitates assembling, cleaning, etc.

What I claim is:

1. A lawn trimmer, comprising a fixed shear blade mounted on a suitable carriage, a movable shear blade adjacent thereto and coöperating therewith, an oscillatory blade holder, a spring attached at one end to the blade holder and carrying the movable blade at the other end whereby the two blades are maintained in coöperative position, and means for oscillating the blade holder.

2. A lawn trimmer, comprising an operating wheel, a fixed shear blade supported therefrom, cam surfaces on the operating wheel, an oscillatory blade holder detachably pivoted to the fixed blade, arms on the blade holder to engage the cam surfaces on the wheel, a flat spring fastened to the blade holder and projecting therefrom, and an oscillatory shear blade carried by the projecting end of the spring and held thereby in coöperative relation to the fixed blade.

3. A lawn trimmer, comprising an operating wheel having a cam adjacent to the rim thereof, said cam being serpentine in plane development and having opposite cam surfaces, a body member supported by the operating wheel and having a fixed shear blade attached thereto, an oscillatory member superimposed upon the fixed blade and pivoted thereto and carrying a coöperating shear blade, arms on the oscillatory member embracing the rim of the wheel and engaging opposite sides of the cam and guide rollers mounted on the body member engaging opposite sides of the rim of the wheel to prevent lateral movement thereof.

4. A lawn trimmer, comprising an operating wheel having a cam adjacent to the rim thereof, a fixed shear blade supported by the wheel, an oscillatory member carrying a coöperating shear blade and detachably pivoted on the fixed blade, arms on the oscillatory member embracing the rim of the wheel and engaging opposite sides of the co-axial cam, a recess in the cam adjacent to the rim of the wheel and a notch in the rim of the wheel opposite the recess, the thickness of metal between the said recess and notch being less than the distance between the ends of the arms on the oscillatory member.

5. A lawn trimmer, comprising an operating wheel having a cam adjacent to the rim thereof, said cam being serpentine in plane development, a body member supported by the wheel, a fixed shear blade attached to the body member, an oscillatory blade holder detachably pivoted to the fixed blade, a recess in the face of the blade holder adjacent to the fixed blade, a flat spring secured in the recess and projecting therefrom, an oscillatory shear blade attached to the projecting end of the spring and held thereby in coöperative relation to the fixed blade, arms on the oscillatory blade holder to embrace the rim of the wheel and engage opposite sides of the cam, a recess in the cam adjacent to the rim of the wheel, a notch in the rim of the wheel opposite the recess in the cam, the thickness of metal between the said recess and notch being less than the distance between the ends of the arms on the oscillatory member and guide rollers mounted on the body member adjacent opposite sides of the rim of the wheel to prevent lateral movement of the same.

In testimony whereof I affix my signature in presence of two witnesses.

FRANCIS E. STOVER.

Witnesses:
HAROLD O. VAN ANTWERP,
PALMER A. JONES.

---

Copies of this patent may be obtained for five cents each, by addressing the "Commissioner of Patents, Washington, D. C."